US012361645B2

United States Patent
Xiong

(10) Patent No.: US 12,361,645 B2
(45) Date of Patent: Jul. 15, 2025

(54) MESH TRANSFORMATION WITH EFFICIENT DEPTH RECONSTRUCTION AND FILTERING IN PASSTHROUGH AUGMENTED REALITY (AR) SYSTEMS

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 18/296,302

(22) Filed: Apr. 5, 2023

(65) Prior Publication Data

US 2024/0169673 A1 May 23, 2024

Related U.S. Application Data

(60) Provisional application No. 63/427,062, filed on Nov. 21, 2022.

(51) Int. Cl.
  *G06T 17/20* (2006.01)
  *G06T 7/50* (2017.01)
  *G06T 19/00* (2011.01)

(52) U.S. Cl.
  CPC ............ *G06T 17/205* (2013.01); *G06T 7/50* (2017.01); *G06T 19/006* (2013.01)

(58) Field of Classification Search
  CPC ..... G06T 17/205; G06T 17/00; G06T 17/005; G06T 17/05; G06T 7/50; G06T 15/00;
  (Continued)

(56) References Cited

U.S. PATENT DOCUMENTS 8,587,583 B2 * 11/2013 Newcombe ............ G06T 17/00
                                                                345/422
9,690,376 B2    6/2017 Davis et al.
(Continued)

FOREIGN PATENT DOCUMENTS

KR    10-2014-0000315 A    1/2014
KR    10-2014-0007367 A    1/2014
(Continued)

OTHER PUBLICATIONS

International Search Report and Written Opinion of the International Searching Authority dated Nov. 2, 2023 in connection with International Patent Application No. PCT/KR2023/011504, 10 pages.
(Continued)

*Primary Examiner* — Vijay Shankar

(57) ABSTRACT

A method includes obtaining images of an environment captured by imaging sensors associated with a passthrough AR device and position data and depth data associated with the images. The method also includes generating a point cloud representative of the environment based on the images, position data, and depth data. The method further includes generating a mesh for a specified image. The mesh includes grid points at intersections of mesh lines. The method also includes determining one or more depths of one or more grid points of the mesh. The method further includes transforming the mesh from a viewpoint of a specified imaging sensor that captured the specified image to a user viewpoint of the passthrough AR device based on the depth(s) of the grid point(s). In addition, the method includes rendering a virtual view of the specified image for presentation by the passthrough AR device based on the transformed mesh.

20 Claims, 10 Drawing Sheets

(58) Field of Classification Search
CPC ....... G06T 15/10; G06T 15/80; G06T 19/006; G06F 3/011; G06F 3/012; G06F 3/013; G06F 3/04815
See application file for complete search history.

(56) References Cited

U.S. PATENT DOCUMENTS

| | | | |
|---|---|---|---|
| 10,284,839 | B2* | 5/2019 | Liu .................. G06F 3/012 |
| 11,024,073 | B2 | 6/2021 | Sagong et al. |
| 11,410,387 | B1 | 8/2022 | Alderman et al. |
| 11,922,562 | B2 | 3/2024 | Wetzstein et al. |
| 2012/0194516 | A1* | 8/2012 | Newcombe ............. G06T 17/00 345/420 |
| 2014/0055352 | A1 | 2/2014 | Davis et al. |
| 2016/0140761 | A1 | 5/2016 | Saunders et al. |
| 2019/0318548 | A1 | 10/2019 | Kim et al. |
| 2019/0355138 | A1 | 11/2019 | Hall et al. |
| 2021/0407169 | A1 | 12/2021 | Swann et al. |
| 2022/0189104 | A1 | 6/2022 | Wetzstein et al. |
| 2022/0207816 | A1 | 6/2022 | Marra et al. |
| 2024/0161406 | A1* | 5/2024 | Mech .................. G06T 5/77 |

FOREIGN PATENT DOCUMENTS

| | | |
|---|---|---|
| KR | 10-2021-0004776 A | 1/2021 |
| WO | 2017065348 A1 | 4/2017 |
| WO | 2021053604 A1 | 3/2021 |

OTHER PUBLICATIONS

Cha et al., "Resolving Occlusion Method of Virtual Object in Simulation Using Snake and Picking Algorithm," 7th International Conference on Computational Science 2007 (ICCS 2007), May 2007, 9 pages.

* cited by examiner

MESH TRANSFORMATION WITH EFFICIENT DEPTH RECONSTRUCTION AND FILTERING IN PASSTHROUGH AUGMENTED REALITY (AR) SYSTEMS

CROSS-REFERENCE TO RELATED APPLICATION AND PRIORITY CLAIM

This application claims priority under 35 U.S.C. § 119(e) to U.S. Provisional Patent Application No. 63/427,062 filed on Nov. 21, 2022, which is hereby incorporated by reference in its entirety.

TECHNICAL FIELD

This disclosure relates generally to augmented reality (AR) systems and processes. More specifically, this disclosure relates to mesh transformation with efficient depth reconstruction and filtering in passthrough AR systems.

BACKGROUND

Augmented reality (AR) systems are becoming more and more popular over time, and numerous applications have been and are being developed for AR systems. An AR system typically enhances a user's view of his or her current environment by overlaying digital content (such as information or virtual objects) over the user's view of the current environment. For example, an AR system can often seamlessly blend virtual objects generated by computer graphics with real-world scenes.

SUMMARY

This disclosure relates to mesh transformation with efficient depth reconstruction and filtering in passthrough augmented reality (AR) systems.

In a first embodiment, a method includes obtaining images of an environment captured by imaging sensors associated with a passthrough AR device, position data associated with the images, and depth data associated with the images. The method also includes generating a point cloud that is representative of the environment based on the images, the position data, and the depth data. The method further includes generating a mesh for a specified one of the images, where the mesh includes grid points at intersections of mesh lines. The method also includes determining one or more depths of one or more of the grid points of the mesh. The method further includes transforming the mesh from a viewpoint of a specified one of the imaging sensors that captured the specified image to a user viewpoint of the passthrough AR device based on the one or more depths of the one or more grid points. In addition, the method includes rendering a virtual view of the specified image for presentation by the passthrough AR device based on the transformed mesh.

In a second embodiment, a passthrough AR device includes imaging sensors configured to capture images of an environment. The passthrough AR device also includes at least one processing device configured to obtain the images, position data associated with the images, and depth data associated with the images. The at least one processing device is also configured to generate a point cloud that is representative of the environment based on the images, the position data, and the depth data. The at least one processing device is further configured to generate a mesh for a specified one of the images, where the mesh includes grid points at intersections of mesh lines. The at least one processing device is also configured to determine one or more depths of one or more of the grid points of the mesh. The at least one processing device is further configured to transform the mesh from a viewpoint of a specified one of the imaging sensors that captured the specified image to a user viewpoint of the passthrough AR device based on the one or more depths of the one or more grid points. In addition, the at least one processing device is configured to render a virtual view of the specified image based on the transformed mesh. The passthrough AR device further includes at least one display configured to present the virtual view.

In a third embodiment, a non-transitory machine readable medium contains instructions that when executed cause at least one processor of a passthrough AR device to obtain images of an environment captured by imaging sensors associated with the passthrough AR device, position data associated with the images, and depth data associated with the images. The non-transitory machine readable medium also contains instructions that when executed cause the at least one processor to generate a point cloud that is representative of the environment based on the images, the position data, and the depth data. The non-transitory machine readable medium further contains instructions that when executed cause the at least one processor to generate a mesh for a specified one of the images, where the mesh includes grid points at intersections of mesh lines. The non-transitory machine readable medium also contains instructions that when executed cause the at least one processor to determine one or more depths of one or more of the grid points of the mesh. The non-transitory machine readable medium further contains instructions that when executed cause the at least one processor to transform the mesh from a viewpoint of a specified one of the imaging sensors that captured the specified image to a user viewpoint of the passthrough AR device based on the one or more depths of the one or more grid points. In addition, the non-transitory machine readable medium contains instructions that when executed cause the at least one processor to render a virtual view of the specified image for presentation by the passthrough AR device based on the transformed mesh.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
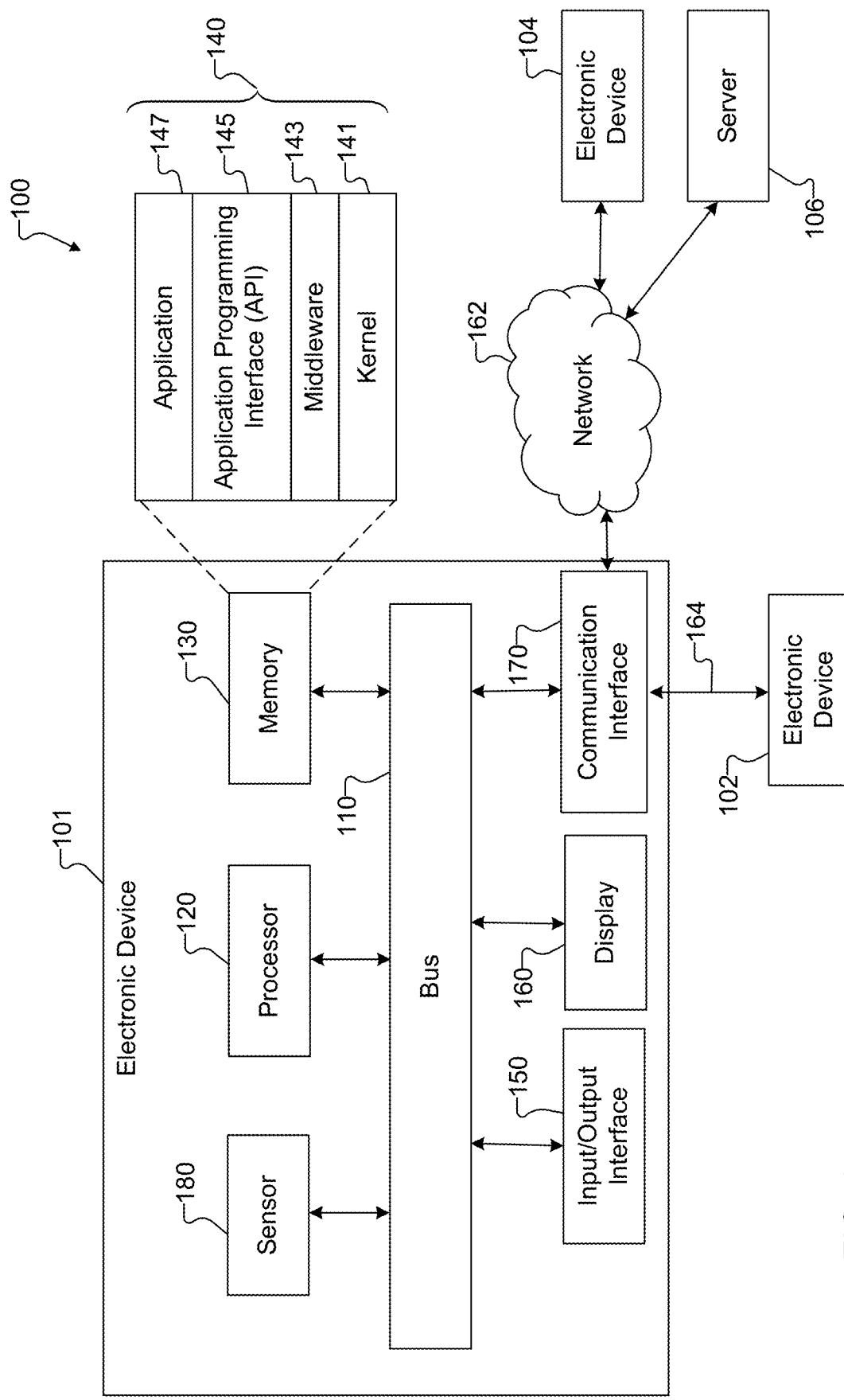
FIG. 1 illustrates an example network configuration including an electronic device in accordance with this disclosure.

FIGS. 1 through 11, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, augmented reality (AR) systems are becoming more and more popular over time, and numerous applications have been and are being developed for AR systems. An AR system typically enhances a user's view of his or her current environment by overlaying digital content (such as information or virtual objects) over the user's view of the current environment. For example, an AR system can often seamlessly blend virtual objects generated by computer graphics with real-world scenes.

An "optical see-through" AR system generally allows a user to view his or her environment directly, where light from the user's environment is passed to the user's eyes. Digital content can be superimposed onto the user's view of the environment using one or more panels or other structures through which the light from the user's environment passes. In contrast, a "passthrough" AR system generally uses see-through cameras to capture images of a user's environment. Digital content can be blended with the captured images, and the mixed images are displayed to the user for viewing. Both approaches can provide immense contextual augmented reality experiences for users.

In a passthrough AR pipeline, see-through cameras typically cannot be installed exactly at the positions at which a user views rendered images. As a result, images that are captured by the see-through cameras can be transformed from the viewpoints of the see-through cameras to the viewpoints of virtual rendering cameras, which represent the locations of one or more displays on which the user views the rendered images. Unfortunately, in a passthrough AR pipeline, the see-through cameras are typically high-resolution cameras (such as 2K or 4K cameras currently). Transforming high-resolution images from the viewpoints of the see-through cameras to the viewpoints of the virtual rendering cameras can be a time-consuming, resource-intensive, and computationally-expensive process, which becomes even worse as the resolutions of the see-through cameras continue to increase.

This disclosure provides techniques for mesh transformation with efficient depth reconstruction and filtering in AR systems. As described in more detail below, images of an environment captured by imaging sensors associated with an AR device, position data associated with the images, and depth data associated with the images are obtained. A point cloud that is representative of the environment is generated based on the images, the position data, and the depth data. For each of at least one of the images, a mesh for the image is generated, where the mesh includes grid points at intersections of mesh lines within the mesh. One or more depths of one or more of the grid points of the mesh are determined, and the mesh is transformed from a viewpoint of a specified one of the imaging sensors that captured the image to a user viewpoint of the AR device based on the one or more depths of the one or more grid points. A virtual view of the image is rendered for presentation by the AR device based on the transformed mesh. This can be performed for any number of images in order to generate any number of virtual views for presentation by the AR device.

In this way, the described techniques support depth reconstructing and filtering for images being processed for presentation by an AR device. Ordinarily, a high-quality depth map of an image is needed for image processing operations like viewpoint and parallax correction. Rather than trying to obtain a depth map that identifies the depth of each pixel in each high-resolution image, the described techniques create a mesh for each high-resolution image and transform the mesh from the viewpoint of a see-through camera to the viewpoint of a virtual rendering camera. This type of approach can significantly reduce the processing and memory resources needed to perform the image transformations and can significantly reduce the amount of time needed to perform the image transformations. Moreover, these techniques can be easily integrated into a graphics rendering pipeline of a graphics processing unit (GPU) or other component and can be seamlessly combined with rendering algorithms implemented in the GPU or other component.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform one or more functions related to mesh transformations with efficient depth reconstruction and filtering for at least one AR application.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform mesh transformations with efficient depth reconstruction and filtering for at least one AR application. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided.

The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include one or more cameras or other imaging sensors, which may be used to capture images of scenes. The sensor(s) 180 can also include at least one depth sensor for estimating depths within scenes being imaged. The sensor(s) 180 can further include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to mesh transformations with efficient depth reconstruction and filtering for at least one AR application.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
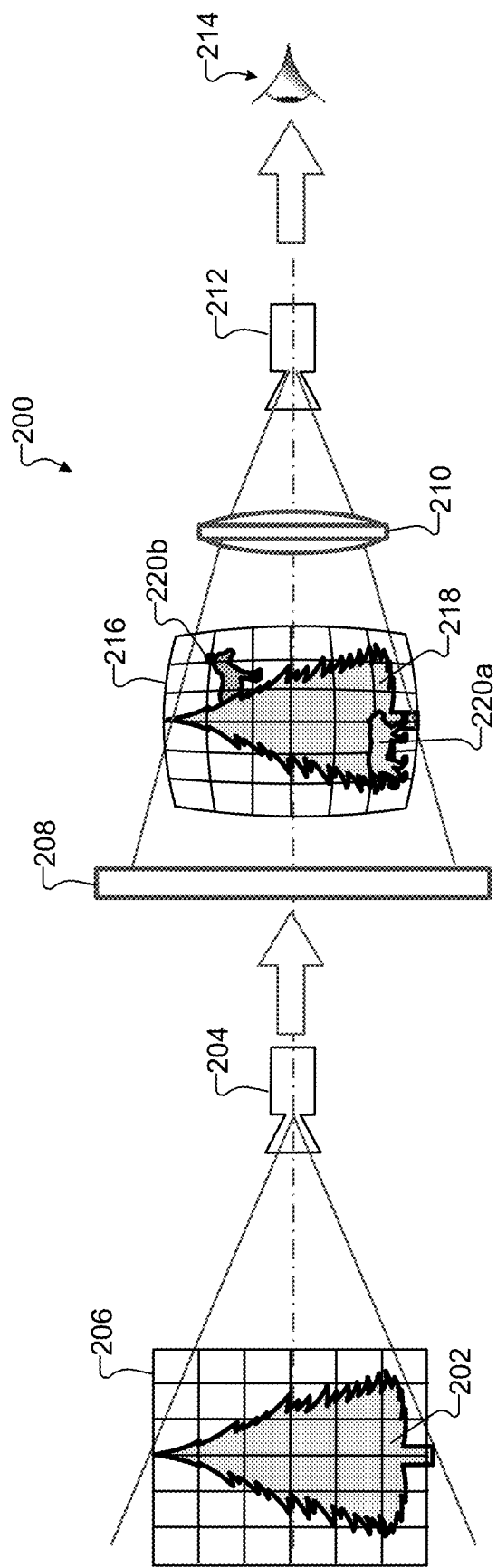
FIG. 2 illustrates an example approach for providing passthrough augmented reality (AR) using mesh transformation with efficient depth reconstruction and filtering in accordance with this disclosure.

FIG. 2 illustrates an example approach 200 for providing passthrough AR using mesh transformation with efficient depth reconstruction and filtering in accordance with this disclosure. For ease of explanation, the approach 200 of FIG. 2 is described as being performed using the electronic device 101 in the network configuration 100 of FIG. 1. However, the approach 200 of FIG. 2 may be performed using any other suitable device(s) and in any other suitable system(s).

As shown in FIG. 2, a scene being imaged includes an object 202. In this example, the object 202 represents a tree, although the object 202 may represent any other suitable real-world object. A see-through camera 204 (which may represent an imaging sensor 180 of the electronic device 101) can be used to capture images that include the object 202. These images are captured from the viewpoint of the see-through camera 204, which will have a specified position in space relative to the object 202 during image capture. Using the techniques described below, the electronic device 101 defines a mesh 206 associated with each image of the object 202 being processed. In this example, the mesh 206 includes horizontal and vertical grid lines, and grid points can be defined where the horizontal and vertical grid lines intersect. The electronic device 101 operates to generate images on a display panel 208 (which may represent a display 160 of the electronic device 101). The displayed images are focused using a display lens 210, thereby producing images at a position associated with a virtual rendering camera 212. The produced images are viewable by an eye 214 of a user of the electronic device 101.

As described below, the images presented on the display panel 208 can be generated by performing a transformation of the mesh 206 associated with each image of the object 202, which results in the creation of a transformed mesh 216 for each image. The transformation that is performed here is done to transform each mesh 206 (which is taken from the viewpoint of the see-through camera 204) into an associated transformed mesh 216 (which is taken from the viewpoint of the virtual rendering camera 212). This is accomplished by using a depth-based transformation approach for the mesh transformation. Moreover, sparse depth points or a low-resolution depth map may be available for use in transforming each mesh 206, which means that only some random sparse depth points may be available for a high-resolution image being processed. The techniques described below support depth reconstructing and filtering, which can be used to generate new depths for grid points that lack depth information. In some embodiments, a depth for each of one or more of the grid points associated with an image being processed can be determined based on image and depth feature information, spatial information, object pose information, and image intensity information.

Once each mesh 206 is transformed, the transformed mesh 216 can be applied to the image of the object 202, resulting in a transformed object 218 that can be presented on the display panel 208. This can be accomplished by transforming the grid points of each mesh 206 (which is defined in the three-dimensional or "3D" space imaged by the see-through camera 204) into corresponding grid points of a transformed mesh 216 (which is defined in the 3D space virtually imaged by the virtual rendering camera 212). This transformation is based on the relationship between the 3D spaces of the see-through camera 204 and the virtual rendering camera 212. In addition, the electronic device 101 can perform parallax correction and occlusion overlapping in order to insert digital content into rendered images generated based on the transformed meshes 216. In some cases, the digital content takes the form of one or more virtual objects 220a-220b, which in this example take the form of one or more virtual animals. The electronic device 101 can determine a parallax of each virtual object 220a-220b and a position of each virtual object 220a-220b relative to one or more real objects 202 in an image, providing the ability to blend digital content into images more effectively.

Note that the same type of structure shown in FIG. 2 may be duplicated in the electronic device 101 so that both eyes 214 of the user can view images presented on the display panel(s) 208 of the electronic device 101. Thus, the electronic device 101 can include multiple see-through cameras 204 that capture images of a user's environment, and the electronic device 101 can include one or more display panels 208 for presenting rendered images to the user's eyes 214. In some cases, the rendered images can be generated for two positions of two different virtual rendering cameras 212. Also note that two separate display panels 208 (such as left and right display panels separately viewable by the eyes 214 of the user) or a single display panel 208 (such as one where left and right portions of the display panel 208 are separately viewable by the eyes 214 of the user) may be used here.

Although FIG. 2 illustrates one example of an approach 200 for providing passthrough AR using mesh transformation with efficient depth reconstruction and filtering, various changes may be made to FIG. 2. For example, the specific object 202 and virtual objects 220a-220b shown here are examples only and can vary widely based on the environment around the electronic device 101 and the digital content being presented to a user.

Figure 3:
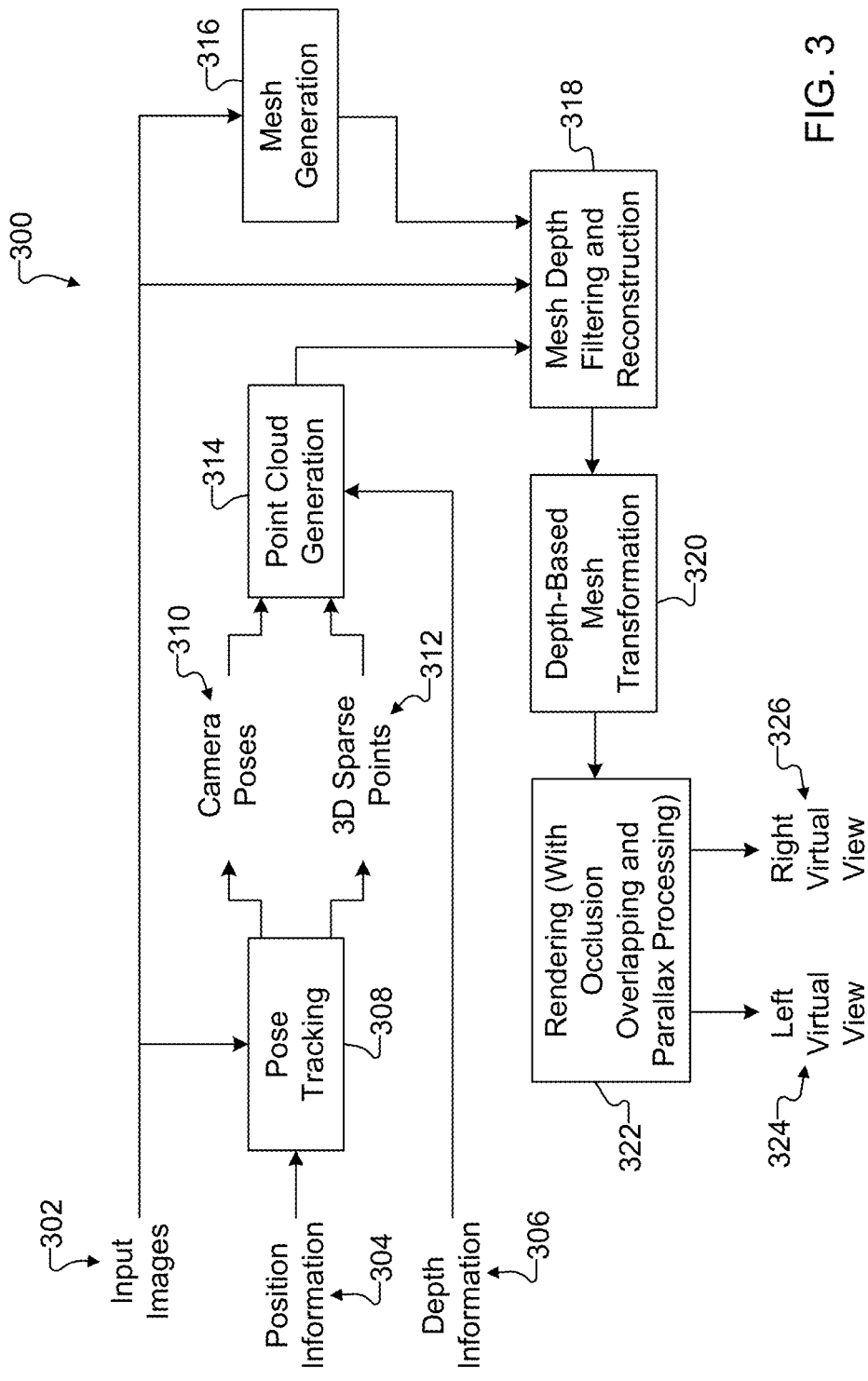
FIG. 3 illustrates an example architecture for mesh transformation with efficient depth reconstruction and filtering in a passthrough AR system in accordance with this disclosure.

FIG. 3 illustrates an example architecture 300 for mesh transformation with efficient depth reconstruction and filtering in a passthrough AR system in accordance with this disclosure. For ease of explanation, the architecture 300 of FIG. 3 is described as being implemented using the electronic device 101 in the network configuration 100 of FIG. 1. However, the architecture 300 may be implemented using any other suitable device(s) and in any other suitable system(s).

As shown in FIG. 3, the architecture 300 obtains input images 302 representing images captured using imaging sensors, such as see-through cameras 204 or other imaging sensors 180 of the electronic device 101. Each input image 302 can have any suitable resolution and dimensions depending on the capabilities of the corresponding imaging sensor 180. In some cases, for instance, each input image 302 may have a 2K or 4K resolution. Each input image 302 can also include image data in any suitable format. In some embodiments, for example, each input image 302 includes RGB image data, which typically includes image data in three color channels (namely red, green, and blue color channels). However, each input image 302 may include image data having any other suitable resolution, form, or arrangement.

The architecture 300 also obtains position information 304 and depth information 306 associated with the input images 302. The position information 304 can be associated with positions of the see-through cameras 204 or other imaging sensors 180 when the input images 302 were captured. In some cases, the position information 304 may be captured using one or more positional sensors 180, such as an inertial measurement unit. The depth information 306 can be associated with different depths within the input images 302, such as various depths or distances estimated between the see-through cameras 204 or other imaging sensors 180 and various portions of the scenes as captured in the input images 302. In some cases, the depth information 306 may be captured using one or more depth sensors 180, and the captured depth information 306 may include a low-resolution depth map or a set of sparse depth points. In various implementations, the resolution of the depth information 306 can be lower (and in some cases much lower) than the resolution of the input images 302.

The input images 302 and position information 304 are provided to a pose tracking operation 308, which generally operates to estimate poses 310 of the see-through cameras 204 or other imaging sensors 180 during the capture of the input images 302. The pose tracking operation 308 also operates to produce 3D sparse points 312, which can include a collection of 3D points identified in each of the input images 302. In some embodiments, the pose 310 of a see-through camera 204 or other imaging sensor 180 that captured an input image 302 may be expressed using six degrees of freedom (6DoF), which can include three distances and three angles. The three distances typically represent the position of the imaging sensor 180 or electronic device 101 relative to a fixed location, such as the imaging sensor or electronic device's position from the fixed location as expressed in distances along three orthogonal axes. The three angles typically represent the orientation of the imaging sensor 180 or electronic device 101 about these three axes, such as the imaging sensor or electronic device's pitch, roll, and yaw. Also, in some cases, the poses 310 and the 3D sparse points 312 for the input images 302 may be obtained simultaneously, such as by applying simultaneous localization and mapping (SLAM) to the input images 302 and the position information 304. Here, simultaneous localization and mapping can be used to track imaging sensor poses and reconstruct 3D points of a scene.

The camera poses 310, 3D sparse points 312, and depth information 306 are provided to a point cloud generation operation 314, which generally operates to generate a 3D point cloud representative of the environment around the electronic device 101. A 3D point cloud represents a collection of points within the 3D space around the electronic device 101, and these points are often associated with real-world objects in the 3D space around the electronic device 101. By using the camera poses 310, 3D sparse points 312, and depth information 306, the point cloud generation operation 314 uses a combination of (i) depth data collected by one or more depth sensors 180 associated with the electronic device 101 and (ii) depth data determined by applying simultaneous localization and mapping to the input images 302 and the position information 304. In some cases, the point cloud generation operation 314 integrates the 3D points as determined using the input images 302 and sparse depth points or low-resolution depths as determined using the depth sensor(s) 180 into a point cloud by performing depth fusion. During the depth fusion process, the point cloud generation operation 314 may give higher priorities or weights to the depths as determined using the depth sensor(s) 180 and lower priorities or weights to the depths as estimated from the input images 302.

The input images 302 are also provided to a mesh generation operation 316, which generally operates to define one or more meshes (such as one or more meshes 206) associated with one or more real-world objects captured in the input images 302. In some embodiments, the mesh generation operation 316 can define each mesh 206 using substantially horizontal and vertical grid lines. The number of grid lines in each direction and the spacing between adjacent grid lines can be defined in any suitable manner, such as based on a default configuration, a user's custom configuration, or a dynamic definition of the mesh 206 (which may or may not depend on the image content being analyzed). Each mesh 206 can also be sized and shaped to substantially or completely cover at least the associated real-world object. As noted above, the meshes 206 defined here can represent meshes from the viewpoints of the see-through cameras 204 or other imaging sensors 180 that captured the input images 302.

The input images 302, 3D point cloud, and meshes are provided to a mesh depth filtering and reconstruction operation 318, which generally operates to produce a higher-resolution collection of depths for each of the defined meshes. For example, the architecture 300 may be used to perform the transformation of a mesh 206 into a transformed mesh 216 based on depths for the grid points of the mesh 206, where each grid point of the mesh 206 is defined where two grid lines intersect. The mesh depth filtering and reconstruction operation 318 can therefore operate to identify depths for various grid points of each mesh 206 provided by the mesh generation operation 316. In some cases, if a grid point of a mesh 206 corresponds to a depth measured by a depth sensor 180, the mesh depth filtering and reconstruction operation 318 can use that measured depth. If a grid point of a mesh 206 does not have an associated measured depth, the mesh depth filtering and reconstruction operation 318 can estimate a depth for that grid point using other depths. As a result, the mesh depth filtering and reconstruction operation 318 can operate to determine depths of grid points of meshes 206 when those depths are unknown, thereby producing higher-resolution depth maps or other higher-resolution depth information for the input images 302. The mesh depth filtering and reconstruction operation 318 can also clarify depths with low confidence scores at grid points by removing false depths and depth noises within the higher-resolution collection of depths.

The higher-resolution depth information is provided to a depth-based mesh transformation operation 320, which generally operates to transform the meshes associated with the input images 302 (such as the meshes 206) into transformed meshes (such as the transformed meshes 216). For example, the depth-based mesh transformation operation 320 can perform these transformations based on relationships between the see-through cameras 204 or other imaging sensors 180 and the virtual rendering cameras 212. As a particular example, the depth-based mesh transformation operation 320 can perform these transformations based on (i) a relationship between a known position of one see-through camera 204 or other imaging sensor 180 and a known position of one virtual rendering camera 212 and (ii) a relationship between a known position of another see-through camera 204 or other imaging sensor 180 and a known position of another virtual rendering camera 212. This process helps to transform the meshes 206 (which are taken from the viewpoints of the see-through cameras 204) into the transformed meshes 216 (which are taken from the viewpoints of the virtual rendering cameras 212). During the mesh transformations, the depth-based mesh transformation operation 320 can correct for parallax differences between these two viewpoints for the real-world information captured by the see-through cameras 204 or other imaging sensors 180.

A rendering operation 322 uses the transformed meshes 216 in order to render left and right virtual views 324, 326 of the environment around the electronic device 101. For example, the rendering operation 322 may warp the input images 302 and blend digital content (such as one or more virtual objects 220a-220b) into the input images 302 using the transformed meshes 216. Part of the rendering process can include occlusion overlapping and parallax processing. Occlusion overlapping can be done to help ensure that the digital content occludes or is occluded by one or more real-world objects as appropriate. The parallax processing can be done to help compensate for parallax associated with the different positions of the virtual rendering cameras 212. Here, the rendering operation 322 can determine a parallax of each virtual object and a position of each virtual object (relative to one or more real-world objects) in the input images 302 based on the transformed meshes 216 and can render the virtual views 324, 326 to include each virtual object based on the determined parallax and the determined position. Thus, the end result here is that the left and right virtual views 324, 326 allow the user to see images that integrate transformed real-world information from the see-through cameras 204 or other imaging sensors 180 and one or more virtual objects that are parallax- and distortion-corrected. The use of the transformed meshes 216 here can help to ensure that the digital content is inserted into the input images 302 in an effective and pleasing manner.

In this example, the left and right virtual views 324, 326 may represent a stereo image pair that is generated and presented to a user. Here, the stereo image pair represents a 2.5-dimensional (2.5D) view of the environment around the electronic device 101. A 2.5D view generally refers to a view of a scene that includes some depth information, but the depth information is not necessarily provided for each location in the scene. Rather, each of the left and right virtual views 324, 326 in the stereo image pair can include multiple collections of pixels, such as pixels in different layers of image data or pixels in different portions within the scene. For each collection of pixels, a common depth (such as a depth at a grid point of a transformed mesh 216) can be associated with the pixels in that collection of pixels. This type of approach can reduce the number of computations needed and can speed up the process of generating the 2.5D views based on the input images 302. This can be particularly useful if the architecture 300 is used to process a large number of input images 302 sequentially in order to provide a stream of stereo image pairs to the display panel(s) 208 for presentation to the user.

Overall, the architecture 300 described above can be faster and more efficient compared to other algorithms. For example, the architecture 300 can require fewer computational resources for determining depth information from the input images 302 and fewer computational resources for inserting digital content into the input images 302. Moreover, the architecture 300 can be easily integrated into a graphics rendering pipeline of a GPU or other component, which can reduce or avoid the need to transfer data back-and-forth with a CPU or other component and thereby reduce latency and memory consumption. In addition, converting the input images 302 to 2.5D views takes less computational power and fewer resources than converting the same input images 302 to 3D views, since true depths and volume reconstruction are not needed. Among other things, these benefits can allow the architecture 300 to be used by electronic devices having smaller processing powers.

It should be noted that the functions shown in or described with respect to FIG. 3 can be implemented in an electronic device 101, 102, 104, server 106, or other device(s) in any suitable manner. For example, in some embodiments, at least some of the functions shown in or described with respect to FIG. 3 can be implemented or supported using one or more software applications or other software instructions that are executed by the processor 120 of the electronic device 101, 102, 104, server 106, or other device(s). In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Although FIG. 3 illustrates one example of an architecture 300 for mesh transformation with efficient depth reconstruction and filtering in a passthrough AR system, various changes may be made to FIG. 3. For example, various components and functions in FIG. 3 may be combined, further subdivided, replicated, omitted, or rearranged according to particular needs. Also, one or more additional components or functions may be included if needed or desired.

Figure 4:
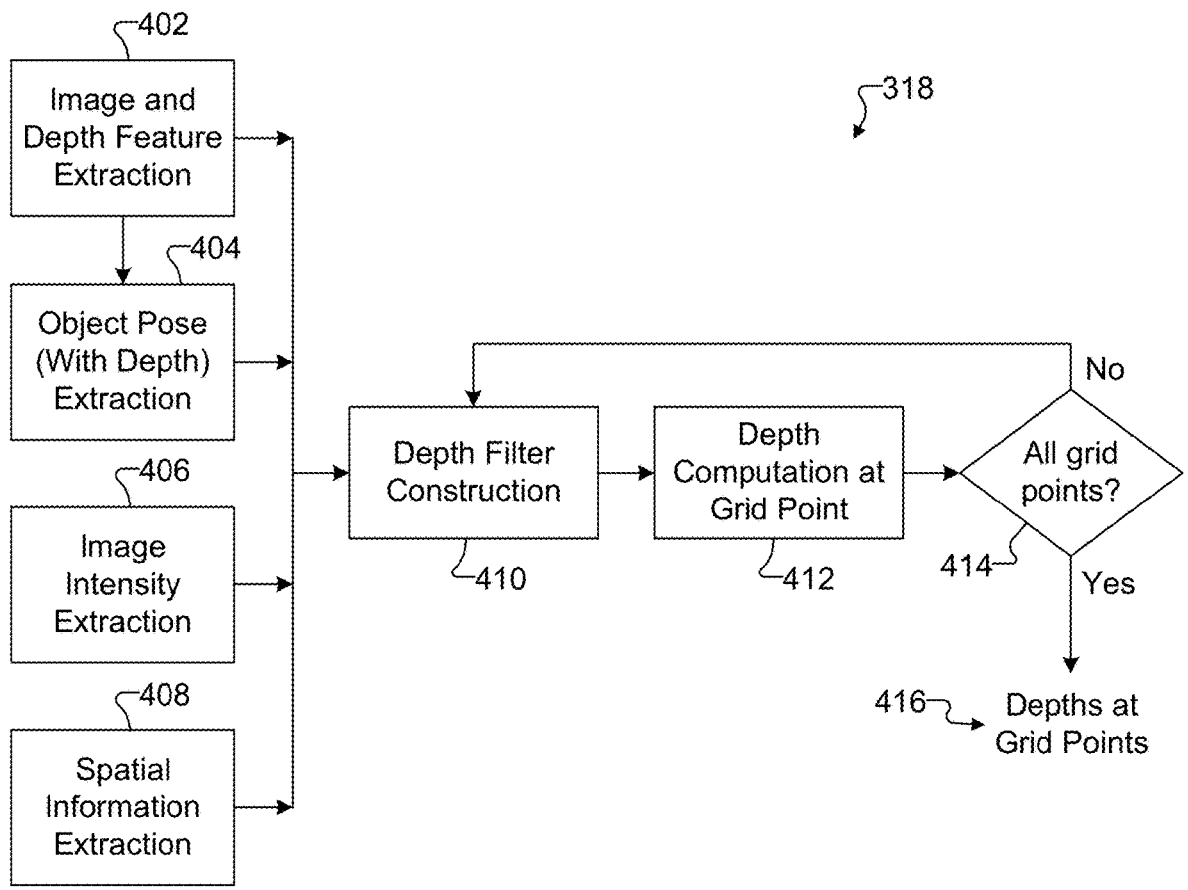
FIG. 4 illustrates an example process for performing mesh depth filtering and reconstruction in the architecture of FIG. 3 in accordance with this disclosure.

FIG. 4 illustrates an example process 400 for performing mesh depth filtering and reconstruction in the architecture 300 of FIG. 3 in accordance with this disclosure. The example shown here represents one example technique for performing at least part of the mesh depth filtering and reconstruction operation 318 in the architecture 300 of FIG. 3. As described above, the mesh depth filtering and reconstruction operation 318 is used to create higher-resolution depth information for the meshes 206.

As shown in FIG. 4, various extraction operations 402, 404, 406, 408 are performed in order to obtain information used to create higher-resolution depth information. For example, an image and depth feature extraction operation 402 generally operates to extract specified features from the input images 302 and the depth information as defined in the 3D point cloud provided by the point cloud generation operation 314. In some cases, the extracted features of the input images 302 may include color texture information associated with the image contents of the input images 302. The specified features that are identified here can represent features that have been identified as being relevant to the mesh depth filtering and reconstruction functionality. As a particular example, the specified features may represent features that a machine learning model has learned are relevant to the depth filtering and reconstruction. Note that at this point the depth information as defined in the 3D point cloud provided by the point cloud generation operation 314 can represent sparse depth information (such as sparse depth points or low-resolution depths), meaning the depths that are available typically do not cover all points within the input images 302. In some cases, the sparse depth information can be upscaled, such as by using an interpolation technique like nearest neighbor interpolation, to obtain an intermediate depth map for extracting features of the depths.

An object pose extraction operation 404 generally operates to identify the poses of objects captured in the input images 302. For example, the object pose extraction operation 404 can identify one or more objects of one or more specified types within the input images 302 and identify the pose of each object. In some cases, each pose may be expressed using six degrees of freedom, such as three distances and three angles as discussed above. To facilitate the identifications of the distances, the object poses may be produced using the intermediate depth information generated by the image and depth feature extraction operation 402. An image intensity extraction operation 406 generally operates to identify the intensities of pixels or other areas within the input images 302. The intensity information can be determined using the contents of the input images 302. A spatial information extraction operation 408 generally operates to identify spatial information about the input images 302, such as positions of objects and relative positions of objects to each other or to the electronic device 101.

A depth filter construction operation 410 generally operates to process the information obtained by the extraction operations 402, 404, 406, 408 in order to generate depth filters to be subsequently applied to the meshes 206 associated with the objects in the input images 302. Each depth filter generated here can therefore be created based on image feature information, depth feature information, object pose information, image intensity information, spatial information, or any suitable combination thereof. Each depth filter can define how depth information in the neighborhood around a location within an input image 302 can be processed in order to identify the depth information at that location. For instance, each depth filter can identify both (i) the neighborhood area around a grid point to be used to identify depth information for that grid point and (ii) how depth information in the neighborhood area around the grid point is used to identify the depth information for that grid point.

A depth computation operation 412 generally operates to determine a depth at a grid point within a mesh 206 provided by the mesh generation operation 316. Here, the depth is determined by applying the corresponding depth filter (as determined by the depth filter construction operation 410) to the depth information associated with the corresponding input image 302. In some embodiments, a depth filter is applied to a specific grid point in a mesh 206 only if the specific grid point lacks known depth information. If depth information at a specific grid point in a mesh 206 is known, such as when the depth at the grid point was measured by a depth sensor 180, there may be no need to apply a depth filter for that grid point (although it could be done to generate additional data or to verify the measured depth from the depth sensor 180). Note that this may be performed only for a grid point in a mesh 206 provided by the mesh generation operation 316 (rather than for every pixel of each input image 302), which means that depth filters can be applied to the information at and within neighborhoods around grid points only.

A determination operation 414 can be used to confirm whether a depth is available or has been estimated for each grid point of the mesh or meshes 206. If not, the depth filter constructions operation 410 and the depth computation operation 412 can be repeated for an additional grid point, and this can continue until a complete set of depths 416 has been determined for each mesh 206. The complete set of depths 416 can include the measured or estimated depth for each grid point within a mesh 206, and this process can be repeated for each mesh 206. Here, the depth filters may be constructed based on image feature information, depth feature information, object pose information, image intensity information, and/or spatial information, so the estimated depths can have good correspondence with measured depths in their defined neighborhoods. Also, certain features (such as image features) can allow the estimated depths to maintain edge properties and can smooth noisy depths.

Although FIG. 4 illustrates one example of a process 400 for performing mesh depth filtering and reconstruction in the architecture 300 of FIG. 3, various changes may be made to FIG. 4. For example, various components and functions in FIG. 4 may be combined, further subdivided, replicated, omitted, or rearranged according to particular needs. Also, one or more additional components or functions may be included if needed or desired.

In addition, while FIG. 4 illustrates one specific process for mesh depth filtering and reconstruction, various other approaches may be used. For example, a deep neural network or other machine learning model may be trained to generate feature maps, such as a feature map for each image captured by each of multiple see-through cameras 204. Another deep neural network or other machine learning model may be trained to generate disparity maps for rectified versions of the captured images, and depth maps can be generated based on the disparity maps and configuration information of the see-through cameras 204. Viewpoint matching and parallax correction can be performed using the generated depth maps.

Figure 5:
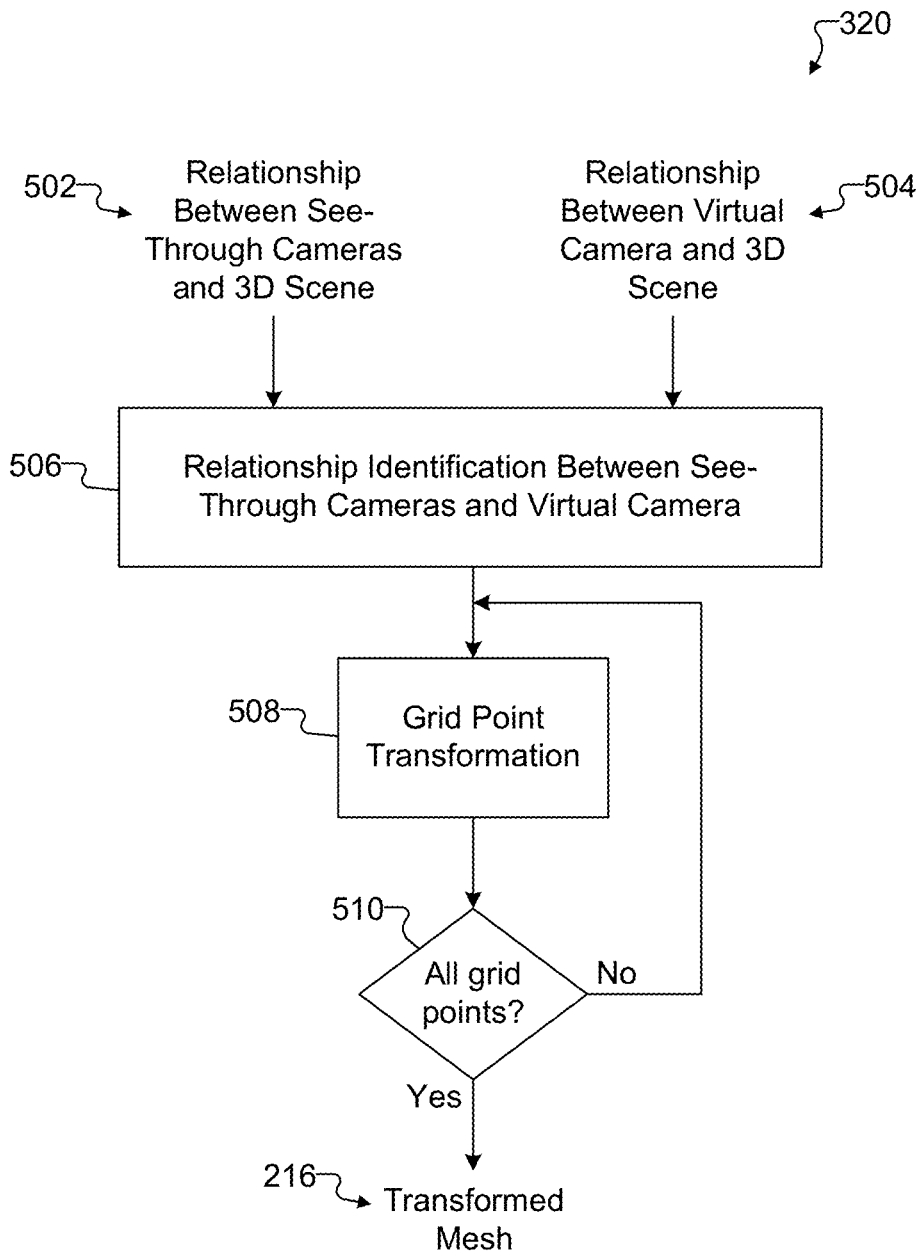
FIG. 5 illustrates an example process for performing depth-based mesh transformation in the architecture of FIG. 3 in accordance with this disclosure.

FIG. 5 illustrates an example process 500 for performing depth-based mesh transformation in the architecture 300 of FIG. 3 in accordance with this disclosure. The example shown here represents one example technique for performing at least part of the depth-based mesh transformation operation 320 in the architecture 300 of FIG. 3. As described above, the depth-based mesh transformation operation 320 is used to transform meshes 206 into transformed meshes 216 based on the depth information provided by the mesh depth filtering and reconstruction operation 318.

As shown in FIG. 5, the process 500 obtains and uses a relationship 502 between one or more see-through cameras 204 (such as one for each eye of a user) and a 3D scene being imaged by the see-through camera(s) 204. The relationship 502 can be defined in any suitable manner and is often defined based on the configuration of the see-through camera(s) 204. As particular examples, the relationship 502 may be based at least partially on the focal length(s) of the see-through camera(s) 204, a separation of multiple see-through cameras 204, and the orientation(s) of the see-through camera(s) 204. The process 500 also obtains and uses a relationship 504 between one or more virtual rendering cameras 212 (such as one for each eye of the user) and the 3D scene being imaged by the virtual rendering camera(s) 212. The relationship 504 can also be defined in any suitable manner and is often defined based on the configuration of the virtual rendering camera(s) 212. As particular examples, the relationship 504 may be based at least partially on the virtual focal length(s) of the virtual rendering camera(s) 212, a virtual separation of multiple virtual rendering cameras 212, and the virtual orientation(s) of the virtual rendering camera(s) 212.

A relationship identification operation 506 generally operates to generate a relationship between each see-through camera 204 and its corresponding virtual rendering camera 212. For example, the relationship identification operation 506 can process the relationships 502 and 504 in order to determine mathematically how a viewpoint of each see-through camera 204 would need to be transformed in order to create a viewpoint of the corresponding virtual rendering camera 212. Once the relationship between a see-through camera 204 and its corresponding virtual rendering camera 212 is known, a grid point transformation operation 508 can be performed. The grid point transformation operation 508 generally operates to convert the depths at the grid points of each mesh 206 into corresponding depths at corresponding grid points of a transformed mesh 216. A determination operation 510 can be used to confirm whether the grid point transformation operation 508 has transformed all grid points of a mesh 206, and if not the grid point transformation operation 508 can be repeated for another grid point of the mesh 206. This process provides depth-based transformation for all grid points in order to obtain a transformed mesh 216, where the grid points of the mesh 206 (which is associated with the viewpoint of the associated see-through camera 204) have been transformed into corresponding grid points of the transformed mesh 216 (which is associated with the viewpoint of the associated virtual rendering camera 212). As described below, during the depth-based transformation, parallax differences between the mesh 206 at the viewpoint of the see-through camera 204 and the transformed mesh 216 at the viewpoint of the virtual rendering camera 212 can be corrected.

Although FIG. 5 illustrates one example of a process 500 for performing depth-based mesh transformation in the architecture 300 of FIG. 3, various changes may be made to FIG. 5. For example, various components and functions in FIG. 5 may be combined, further subdivided, replicated, omitted, or rearranged according to particular needs. Also, one or more additional components or functions may be included if needed or desired.

Figure 6:
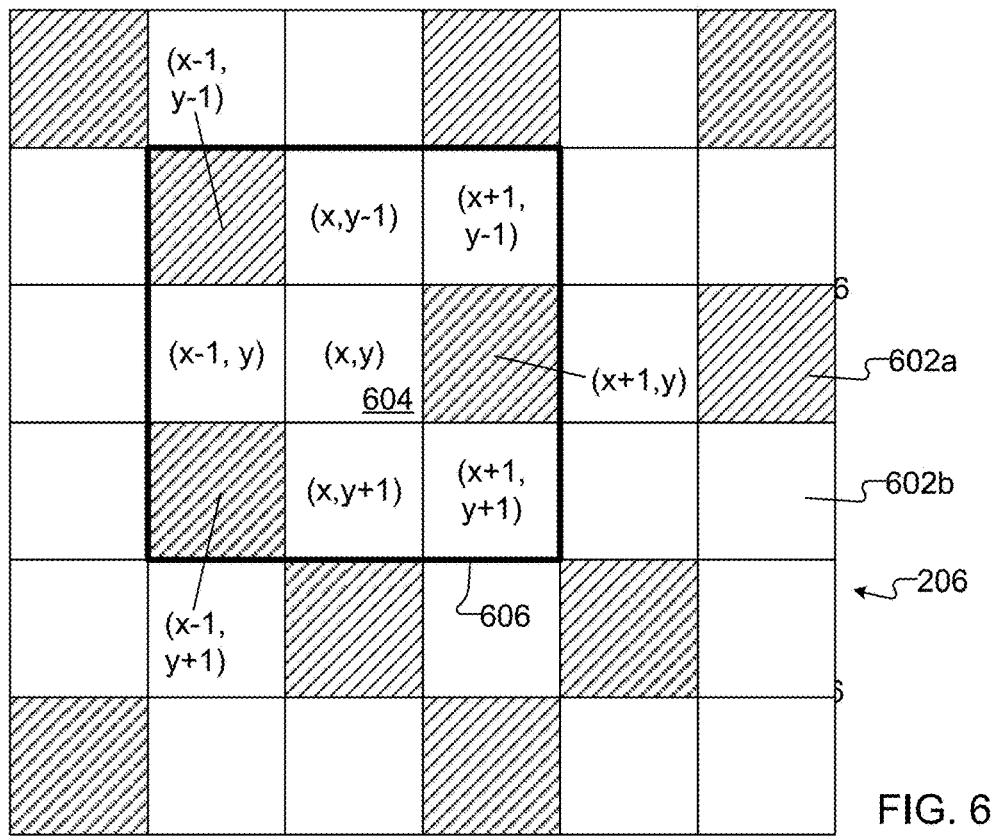
FIG. 6 illustrates an example color texture-guided depth-based transformation of a mesh in accordance with this disclosure.

FIG. 6 illustrates an example color texture-guided depth-based transformation of a mesh in accordance with this disclosure. More specifically, FIG. 6 illustrates an example determination of a depth value based on a depth filter, which may be implemented using the mesh depth filtering and reconstruction operation 318 described above. In this example, the mesh 206 is shown as being associated with depth values arranged in cells 602a-602b. The cells 602a represent pixels for which depth values are known (such as through measurements using a depth sensor 180), and the cells 602b represent pixels for which depth values are not known. Here, a cell 604 represents a pixel on a grid point of a mesh 206.

In an actual passthrough AR pipeline, only sparse depth points or low-resolution depths may be obtained as described above. If the depth for the cell 604 does not exist, a depth for this cell 604 may be estimated using the depths contained in a defined neighborhood 606 around the cell 604. As described above, the cell 604 may represent a grid point within a mesh 206 defined by the mesh generation operation 316, and a depth at that grid point may or may not be known. When the depth at that grid point is not known, the mesh depth filtering and reconstruction operation 318 can generate a depth filter that defines the neighborhood 606 around the cell 604 representing that grid point. Any measured or estimated depths within the defined neighborhood 606 can be used to estimate the depth for the cell 604.

In some cases, the depth filter that is used to define the neighborhood 606 can be created based on image feature information, depth feature information, object pose information, image intensity information, spatial information, or any suitable combination thereof. As a result, image feature information, depth feature information, object pose information, image intensity information, and/or spatial information can be applied in order to generate a new depth from any neighborhood depths. In some embodiments, the depth filter used here can generate a new depth d(x, y) based on the depths d(i, j), (i, j)∈N(x, y) in the neighborhood 606. In particular embodiments, this can be expressed as follows.

$$d(x, y) = \frac{\sum_{(i,j)\in N(x,y)} d(i, j) w(x, y, i, j)}{\sum_{(i,j)\in N(x,y)} w(x, y, i, j)} \quad (1)$$

Here, d(x, y) represents the depth at the considered grid point (the cell 604), and d(i, j) represents the depth at a point in the neighborhood 606 of the considered grid point (x, y) (where (i, j)∈N(x, y)). Also, N(x, y) represents the neighborhood 606 of the considered grid point (x, y), and w(x, y, i, j) represents a weight. In this example, the weight w(x, y, i, j) is defined based on image intensity information, image and depth feature information, spatial information, and available sparse depth information.

As shown in Equation (1), d(i, j), (i, j)∈N(x, y) represents the depths of the points in the neighborhood 606 of the point (x, y). Since only sparse depth information may be available for input to a passthrough AR pipeline, a dense depth map can be estimated using the depths in the neighborhood 606. In some cases, nearest neighbor interpolation can be used to calculate the depths of grid points for which the depths are unknown. In some cases, this can be expressed as follows.

$$D_{est}(i,j) \rightarrow \mathbb{N}(d(k,l)), (k,l) \in N(i,j) \quad (2)$$

Here, $D_{est}(i, j)$ represents the estimated depth at the point (i, j) as determined using the nearest neighbor interpolation approach, $\mathbb{N}(\cdot)$ represents the nearest neighbor interpolation approach, and N(i, j) represents the neighborhood 606 of the point (i, j).

As shown in Equation (1), w(x, y, i, j) represents a weight, which can be based on image intensity information, image and depth feature information, spatial information, and available sparse depth information. In some cases, the weight can be defined as follows.

$$w(x, y, i, j) = \exp\left(-\frac{(x-i)^2 + (y-j)^2}{2\sigma_s^2} - \frac{\|I(x,y) - I(i,j)\|^2}{2\sigma_i^2} - \frac{\|D_{est}(x,y) - D_{est}(i,j)\|^2}{2\sigma_d^2} - \frac{\|F(x,y) - F(i,j)\|^2}{2\sigma_f^2}\right) \quad (3)$$

Here, the term $$\frac{(x-i)^2 + (y-j)^2}{2\sigma_s^2}$$

is used for considering the spatial information, and $\sigma_s$ represents a smoothing parameter. The term $$\frac{\|I(x,y) - I(i,j)\|^2}{2\sigma_i^2}$$

is used for considering the image intensity information, where $I(x, y)$ represents the intensity at pixel $(x, y)$ and $\sigma_i$ is a smoothing parameter. The term $$\frac{\|D_{est}(x,y) - D_{est}(i,j)\|^2}{2\sigma_d^2}$$

is used for considering existing sparse depth information, where $D_{est}(x, y)$ represents the estimated depth at pixel $(x, y)$ and $\sigma_d$ is a smoothing parameter. The term $$\frac{\|F(x,y) - F(i,j)\|^2}{2\sigma_f^2}$$

is used for considering image feature information, where $F(x, y)$ represents feature information at pixel $(x, y)$ and $\sigma_f$ is a smoothing parameter.

Using this approach, estimated depths can be determined for grid points within each mesh 206 at which known or measured depths are unknown. Since the estimated depths can be generated by considering spatial, image, and depth information, this approach can provide high-quality depth values for any number of meshes 206. If a known or measured depth is associated with a grid point in a mesh 206, this approach can still be used, such as to estimate the depth at that grid point in order to verify if the known or measured depth appears to be a true depth or noise depth. In this type of verification process, the depth for a grid point can be estimated using the approach above, and the known or measured depth can be compared to the estimated depth. If a difference between the two is excessive, the known or measured depth may be deemed to be unreliable and can be replaced or otherwise modified using the estimated depth, thereby providing depth filtering.

Although FIG. 6 illustrates one example of a color texture-guided depth-based transformation of a mesh 206, various changes may be made to FIG. 6. For example, the neighborhood 606 may be defined to include any suitable number of cells in any suitable arrangement. Also, the cells 602a-602b that do and do not have depth values can easily vary depending on the circumstances.

Figure 7:
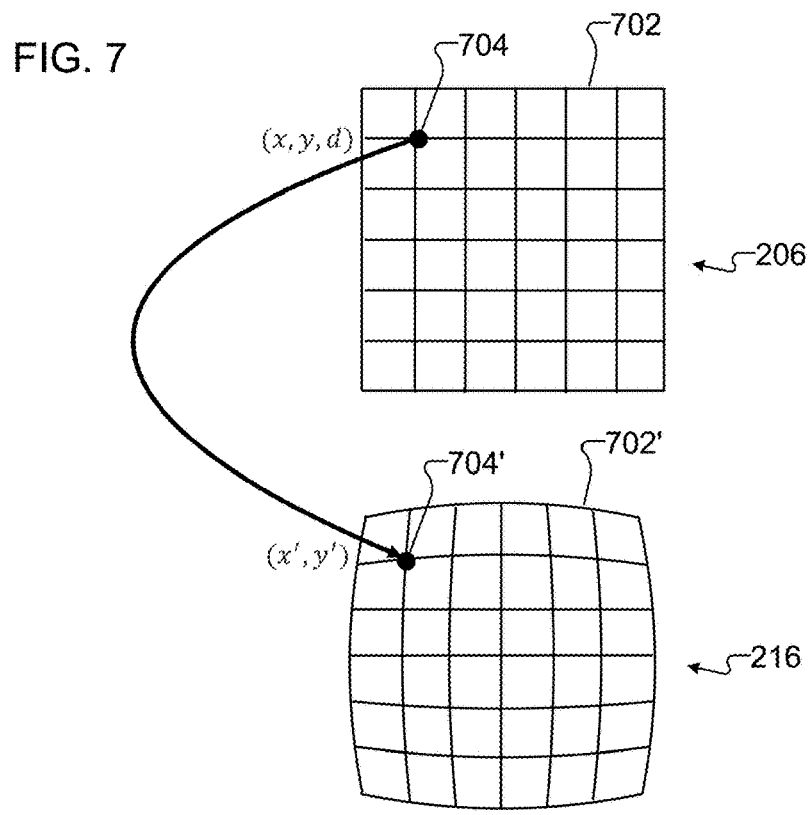
FIG. 7 illustrates an example depth-based transformation of a mesh in accordance with this disclosure.

FIG. 7 illustrates an example depth-based transformation of a mesh in accordance with this disclosure. More specifically, FIG. 7 illustrates an example depth-based transformation of a mesh 206 into a transformed mesh 216, which may be implemented using the depth-based mesh transformation operation 320 described above. In this example, the mesh 206 includes horizontal and vertical grid lines 702, and grid points 704 are defined where the grid lines 702 intersect. Each of the grid points 704 can be associated with two coordinates (such as x and y coordinates) and a depth d. The depth can represent a known or measured depth (such as a depth measured using a depth sensor 180) or an estimated depth (such as a depth estimated using the mesh depth filtering and reconstruction operation 318).

The process 500 of FIG. 5 described above operates to convert the mesh 206 into the transformed mesh 216. In this example, the transformed mesh 216 includes modified grid lines 702', and grid points 704' are defined where the modified grid lines 702' intersect. Each grid line 702 has a corresponding modified grid line 702' (which may or may not be different from the grid line 702), and each grid point 704 has a corresponding grid point 704'. The transformation of the mesh 206 into the transformed mesh 216 by the process 500 of FIG. 5 involves converting depths at the grid points 704 into corresponding depths at the grid points 704'. In some cases, this can be mathematically expressed as follows.

$$(x', y') \rightarrow \mathcal{H}(x, y, d) \quad (4)$$

Here, $(x', y')$ represents a grid point 704', $(x, y, d)$ represents a grid point 704, and $\mathcal{H}$ represents a transformation function that converts the grid point 704 from the viewpoint of a see-through camera 204 to the viewpoint of a virtual rendering camera 212. In this way, it is possible to transform the original mesh 206 to the transformed mesh 216. In some embodiments, OpenGL can be used for interpolating certain grid points 704' within the transformed mesh 216 based on other grid points 704' within the transformed mesh 216.

Although FIG. 7 illustrates one example of a depth-based transformation of a mesh, various changes may be made to FIG. 7. For example, each mesh 206, 216 can include any suitable number of grid lines and any suitable number of grid points. In some cases, the numbers of grid lines and grid points can be adjusted, such as according to the needs of specific applications in specific passthrough AR pipelines or passthrough AR devices. Also, the shapes of the meshes 206, 216 shown here are examples only and can easily vary as needed or desired.

Figure 8:
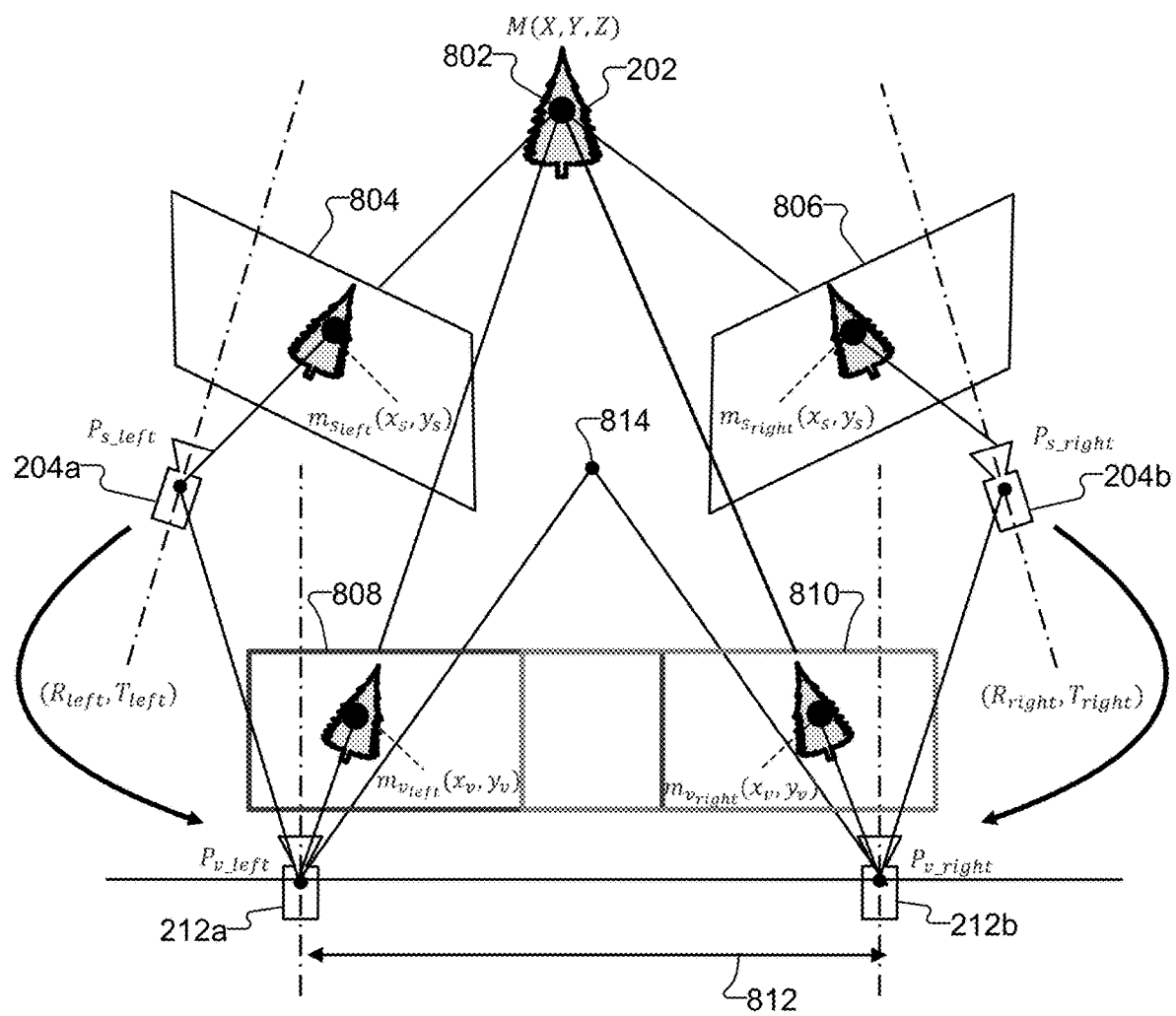
FIG. 8 illustrates an example depth-based transformation of a mesh in a passthrough AR system in accordance with this disclosure.

FIG. 8 illustrates an example depth-based transformation of a mesh in a passthrough AR system in accordance with this disclosure. More specifically, FIG. 8 illustrates how the electronic device 101 or other passthrough AR system may use the approach shown in FIG. 7 along with a combination of two see-through cameras 204a-204b and two virtual rendering cameras 212a-212b. In this example, the electronic device 101 is imaging a 3D object 802, which in this example represents a tree. Suppose M (X, Y, Z) represents a point of the 3D object 802 in the scene. The see-through cameras 204a-204b can be used to capture images 804 and 806 of the object 802. The see-through cameras 204a-204b respectively have camera poses $P_{s\_left}$ and $P_{s\_right}$, and $m_{s_{left}}(x_s, y_s)$ and $m_{s_{right}}(x_s, y_s)$ respectively represent the image point of M (X, Y, Z) on the left and right see-through cameras 204a-204b. The values ($R_{left}$, $T_{left}$) respectively represent the rotation and translation between the left see-through camera 204a and the left virtual rendering camera 212a, and the values ($R_{right}$, $T_{right}$) respectively represent the rotation and translation between the right see-through camera 204b and the right virtual rendering camera 212b.

The electronic device 101 operates to closely match the viewpoint of the left see-through camera 204a to the viewpoint of the left virtual rendering camera 212a and to closely match the viewpoint of the right see-through camera 204b to the viewpoint of the right virtual rendering camera 212b. This converts the captured images 804 and 806 into overlapping virtual images 808 and 810. The virtual rendering cameras 212a-212b respectively have camera poses $P_{v\_left}$ and $P_{v\_right}$, and $m_{v_{left}}(x_v, y_v)$ and $m_{v_{right}}(x_v, y_v)$ respectively represent the image point of M(X, Y, Z) on the left and right virtual rendering cameras 212a-212b. An interpupillary distance (IPD) 812 is shown as the distance between the virtual rendering cameras 212a-212b. A zero parallax point 814 in FIG. 8 represents the location along a central optical axis where the parallax changes sign. For example, the parallax can be negative from the user's eyes to the zero parallax point 814, and the parallax can be positive beyond the zero parallax point 814. The actual location of the zero parallax point 814 can vary based on (among other things) the size of the interpupillary distance 812.

Taking the left see-through camera 204a as an example, the relationship between the point M (X, Y, Z) and the image point $m_{s_{left}}(x_s, y_s)$ can be expressed as follows.

$$m_{s_{left}} = S_{s_{left}} M(X,Y,Z) \quad (5)$$

Here, $S_{s_{left}}$ represents a projection matrix of the left see-through camera 204a. In some cases, this projection matrix may be expressed as follows.

$$S_{s_{left}} = K_{s_{left}}[R_{left}|T_{left}] \quad (6)$$

Here, $K_{s\_left}$ represents a camera matrix of the left see-through 204a, which may be defined in some cases as follows.

$$P_{s_{left}} = [R_{left}|T_{left}] \quad (7)$$

Equation (5) can therefore be rewritten as follows.

$$m_{s_{left}} = K_{s_{left}} P_{s_{left}} M(X,Y,Z) \quad (8)$$

Given this, the image point in the coordinate system of the left see-through camera 204a may be defined as follows.

$$K_{s_{left}}^{-1} m_{s_{left}} = P_{s_{left}} M(X,Y,Z) \quad (9)$$

Similarly, the following may be obtained for the left virtual rendering camera 212a.

$$m_{v_{left}} = K_{s_{left}} P_{v_{left}} M(X,Y,Z) \quad (10)$$

$$K_{s_{left}}^{-1} m_{v_{left}} = P_{v_{left}} M(X,Y,Z) \quad (11)$$

By combining Equations (9) and (11), the following can be obtained.

$$m_{v_{left}} = K_{s_{left}} P_{v_{left}} P_{s_{left}}^{-1} K_{s_{left}}^{-1} m_{s_{left}} \quad (12)$$

Similar equations may be derived for the right see-through camera 204b and the right virtual rendering camera 212b.

Figure 9:
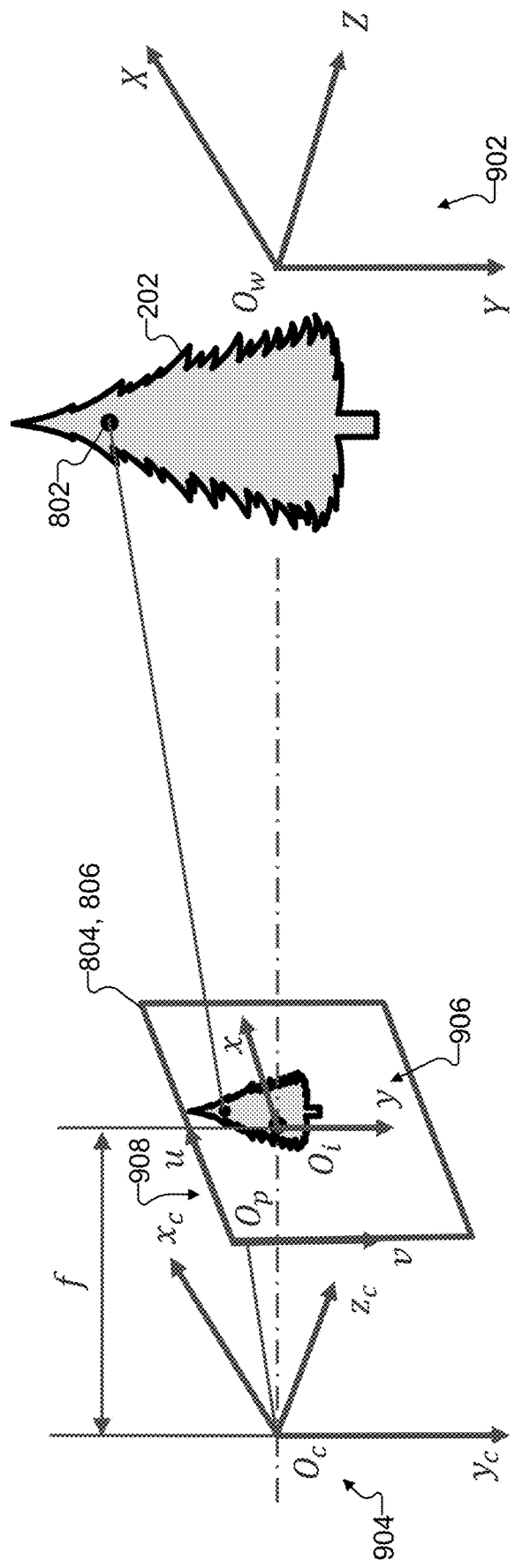
FIG. 9 illustrates example coordinate systems that may be used during depth-based transformation of a mesh in accordance with this disclosure.

FIG. 9 illustrates example coordinate systems that may be used during depth-based transformation of a mesh in accordance with this disclosure. In this example, the coordinate systems are illustrated with respect to the object 802 shown in FIG. 8. The coordinate systems here include a world coordinate system $O_w(X, Y, Z)$ 902, which is defined by three orthogonal axes X, Y, and Z. The coordinate systems here also include a camera coordinate system $O_c(x_c, y_c, z_c)$ 904, which is associated with a see-through camera 204a, 204b and is defined by three orthogonal axes $x_c$, $y_c$, and $z_c$. Images 804 or 806 captured by the see-through camera 204a or 204b are associated with an image coordinate system $O_i(x, y)$ 906, which is defined by two orthogonal axes x and y. The images 804 or 806 captured by the see-through camera 204a or 204b are also associated with a pixel coordinate system $O_p(u, v)$ 908, which is defined by two orthogonal axes u and v. The pixel coordinate system $O_p(u, v)$ 908 in this example has its origin at the upper left-hand corner of the images 804 or 806.

In some embodiments, based on Equation (12) above, it is possible to transform an image 804 from the pose $P_{s\_left}$ of the see-through camera 204a to an image at the pose $P_{v\_left}$ of the virtual rendering camera 212a for viewpoint matching. In some cases, this can be done by converting coordinates from the pixel coordinate system $O_p(u, v)$ 908 into coordinates in a normalized device coordinate (NDC) system in order to obtain NDC coordinates. As a particular example, this coordinate conversion may be performed as follows.

$$\begin{pmatrix} x_{NDC} \\ y_{NDC} \\ z_{NDC} \end{pmatrix} = \begin{pmatrix} 2\frac{u_s}{w} - 1 \\ 2\frac{v_s}{h} - 1 \\ d \end{pmatrix} \quad (13)$$

Here, d represents the depth of the pixel ($u_s$, $v_s$) of the see-through camera 204a, and (w, h) respectively represent the image width and image height. Also, $x_{NDC}$, $y_{NDC}$, and $z_{NDC}$ represent the coordinates in the NDC system. It is possible to create a homogeneous coordinate system based on the NDC coordinates. For instance, homogeneous coordinates may be expressed as follows.

$$\begin{pmatrix} x_h \\ y_h \\ z_h \\ w_h \end{pmatrix} = \begin{pmatrix} x_{NDC} \\ y_{NDC} \\ z_{NDC} \\ 1 \end{pmatrix} \quad (14)$$

As can be seen here, $w_h = 1$. Equation (12) may then be rewritten as follows.

$$\begin{pmatrix} x_v \\ y_v \\ z_v \\ w_v \end{pmatrix} = K_{s\_left} P_{v\_left} P_{s\_left}^{-1} K_{s\_left}^{-1} \begin{pmatrix} x_h \\ y_h \\ z_h \\ w_h \end{pmatrix} \quad (15)$$

From this, transformed image coordinates ($x_v$, $y_v$, $z_v$) at the pose $P_{v\_left}$ of the virtual rendering camera 212a may be determined. It is also possible to determine coordinates in the pixel coordinate system $O_p(u, v)$ 908, such as in the following manner.

$$\begin{pmatrix} u_v \\ v_v \end{pmatrix} = \begin{pmatrix} w \frac{\frac{x_v}{w_v} + 1}{2} \\ h \frac{\frac{y_v}{w_v} + 1}{2} \end{pmatrix} \quad (16)$$

Here, $(u_v, v_v)$ represents the coordinates in the pixel coordinate system $O_p(u, v)$ 908 at the virtual camera pose $P_{v\_left}$, $(x_v, y_v)$ represents the transformed image coordinates from the see-through camera pose $P_{s\_left}$ to the virtual camera pose $P_{v\_left}$, and $w_v$ represents a scale factor. Again, similar equations may be derived for the right see-through camera 204b and the right virtual rendering camera 212b.

Although FIG. 8 illustrates one example of a depth-based transformation of a mesh in a passthrough AR system, various changes may be made to FIG. 8. For example, the specific arrangement of the see-through cameras 204a-204b and virtual rendering cameras 212a-212b is for illustration and explanation only. Although FIG. 9 illustrates examples of coordinate systems that may be used during depth-based transformation of a mesh, various changes may be made to FIG. 9. For instance, each of the coordinate systems may be defined in any other suitable manner.

In addition, while FIGS. 8 and 9 support one specific approach for viewpoint matching of see-through and virtual rendering cameras, various other approaches may be used. For example, the viewpoint matching approach may be extended to cases with one see-through camera and cases with more than two see-through cameras. In cases with one see-through camera 204, the viewpoint of the see-through camera 204 can be matched with the viewpoint of the left virtual rendering camera 212a and separately matched with the viewpoint of the right virtual rendering camera 212b using the same procedure described above. The one see-through camera 204 can be used as both the left see-through camera 204a and the right see-through camera 204b in these examples. In cases with more than two see-through cameras, multiple groups of the see-through cameras may be defined, such as one group that is closer to the left virtual rendering camera 212a and another group that is closer to the right virtual rendering camera 212b. The viewpoints of the cameras in the left group can be matched to the viewpoint of the left virtual rendering camera 212a, and the viewpoints of the cameras in the right group can be matched to the viewpoint of the right virtual rendering camera 212b using the same procedure described above. During viewpoint matching, the contributions of different see-through cameras in each group to the corresponding virtual view can be blended, which can allow the see-through cameras in each group to compensate for one another when they contribute to the virtual view.

Figure 10:
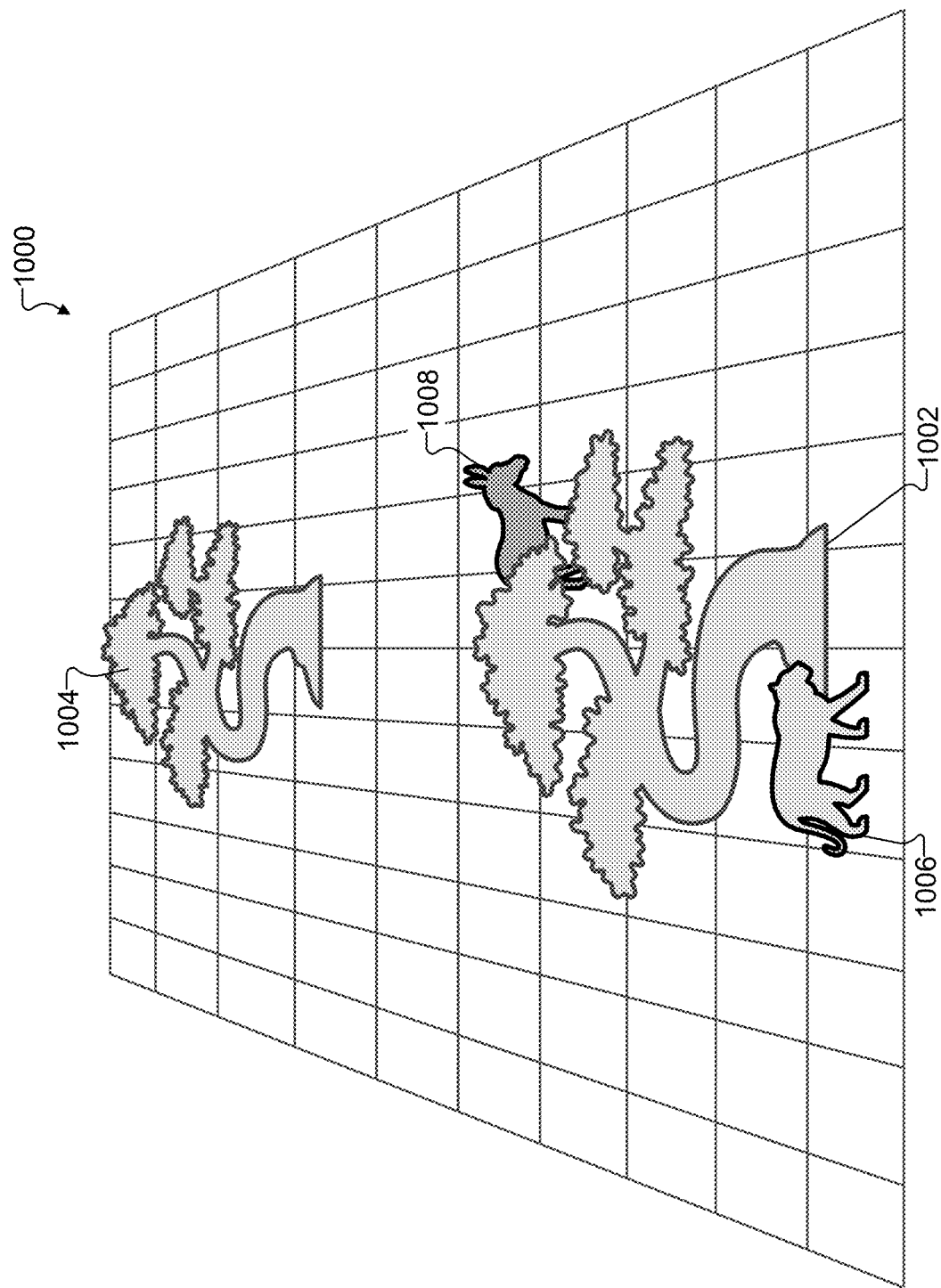
FIG. 10 illustrates example parallax correction and occlusion overlapping for virtual objects in accordance with this disclosure.

FIG. 10 illustrates example parallax correction and occlusion overlapping 1000 for virtual objects in accordance with this disclosure. The example shown here represents one example technique for performing at least part of the rendering operation 322 in the architecture 300 of FIG. 3. As described above, the rendering operation 322 can include occlusion overlapping to help ensure that digital content occludes or is occluded by one or more real-world objects as appropriate and parallax processing to help compensate for parallax associated with different positions of virtual rendering cameras 212a-212b. Ideally, this can help virtual objects to have the same parallax as objects in the real-world scene being imaged.

With depth-based mesh transformations, meshes 206 associated with objects in images captured by the see-through cameras 204a-204b are transformed into meshes 216 associated with the virtual rendering cameras 212a-212b. Among other things, this process involves using depth values for grid points of the meshes 206 that have been estimated as described above in order to produce higher-resolution depth values. Using the higher-resolution depth values enables generation of the transformed meshes 216, as well as the performance of parallax correction and occlusion overlapping for virtual objects, such as those generated by a graphics pipeline.

For parallax collection involving one or more virtual objects, one or more transformed meshes 216 can be used to render one or more virtual objects so that the parallax of each virtual object is the same as or similar to parallax in the real-world scene. This is possible since the depths being used are also obtained from the real-world scene. In FIG. 10, for example, a real-world scene includes two real-world objects 1002 and 1004, which in this example represent trees. Two virtual objects 1006 and 1008 are being inserted into the real-world scene, and the virtual objects 1006 and 1008 represent two animals (a tiger and a horse) in this example. As shown in FIG. 10, the virtual objects 1006 and 1008 can be rendered with appropriate sizes and positions based on the depth information generated using the approaches describe above.

For occlusion overlapping involving one or more virtual objects, one or more transformed meshes 216 can be used to decide which virtual object or objects appear in front of one or more real-world objects and which virtual object or objects are at least partially occluded by one or more real-world objects. In FIG. 10, for example, the virtual object 1006 is rendered in front of the real-world object 1002, and the virtual object 1008 is rendered behind (and therefore is partially occluded by) the real-world object 1002.

As discussed above, the color texture-guided depth generation approaches determine image features, which can include object contours, for depth value generation. It is also possible to determine depths on object contours, such as the contour of each real-world object 1002 and 1004. With depths determined on the object contours, it is possible to determine which portion or portions of each virtual object 1006, 1008 (if any) are occluded. Among other things, it is possible to generate depth values in selected areas and for specific object features so that the depth values can be used for different purposes. Also, since the depth values are estimated using sparse depth information obtained from the captured real-world scene and since the new depths values are located on grid points and are used for rendering virtual objects, the virtual objects and the real-world scene can have the same or similar parallax and occlusions. This allows blending of one or more virtual objects and a captured real-world scene with viewpoint matching to create final virtual views that are more realistic and aesthetically pleasing to users.

Although FIG. 10 illustrates one example of parallax correction and occlusion overlapping 1000 for virtual objects, various changes may be made to FIG. 10. For example, the real-world objects captured in various scenes and the virtual objects or other digital content inserted into various scenes can differ widely based on the particular application and user environment. Also, virtual objects or other digital content may be inserted into various scenes in any other suitable manner.

Note that the techniques described above support the use of viewpoint matching between see-through and virtual rendering cameras with sparse depth information. The techniques described above can be more efficient than approaches that require the generation of depth data for all pixels in captured images and can be more effective than approaches that perform approximation parallax correction and occlusion overlapping. The techniques described above can operate using sparse depth information while still achieving effective parallax correction and occlusion overlapping. Moreover, the techniques described above can be conveniently implemented, such as in the rendering pipelines of GPUs. Among other things, this can avoid the need to transfer image data back and forth between a CPU and a GPU, which as noted above can reduce latency and memory consumption. Further, some transformations in the techniques described above can be combined with rendering transformations, which means that these transformation operations are almost free in terms of processing resources in the rendering pipelines. In addition, some implementations of the techniques described above can reduce or avoid the use of machine learning models, which may be difficult to implement in rendering pipelines in some cases. Some implementations of the techniques described above can be seamlessly combined with rendering pipelines and be implemented with OpenGL shaders.

As a particular example of the benefits that might be obtained using the techniques described, assume that each of the input images 302 has a resolution of 3,000 pixels by 3,000 pixels. Approaches that require dense depth information could require a depth value for each pixel of each input image 302, meaning each input image 302 would have 3,000×3,000 or 9,000,000 depth values. In contrast, assume that each mesh 206 is defined as a collection of 300 grid points by 300 grid points. In those embodiments, mesh processing may involve the use of 300×300 or 90,000 depth values. Similarly, while approaches that require dense depth information could require a depth reprojection for each pixel of each input image 302, each mesh 206 may also be associated with a depth reprojection at each of its grid points to produce a transformed mesh 216. As a result, having fewer depth values (via use of the meshes 206) can require significantly fewer depth reprojections and other computations. While the techniques described above may involve additional operations not necessarily performed in other approaches, the techniques described above can still provide a significant reduction in the total number of operations to be performed, which can reduce the amount of processing and memory resources needed and speed up operation of the electronic device 101.

Figure 11:
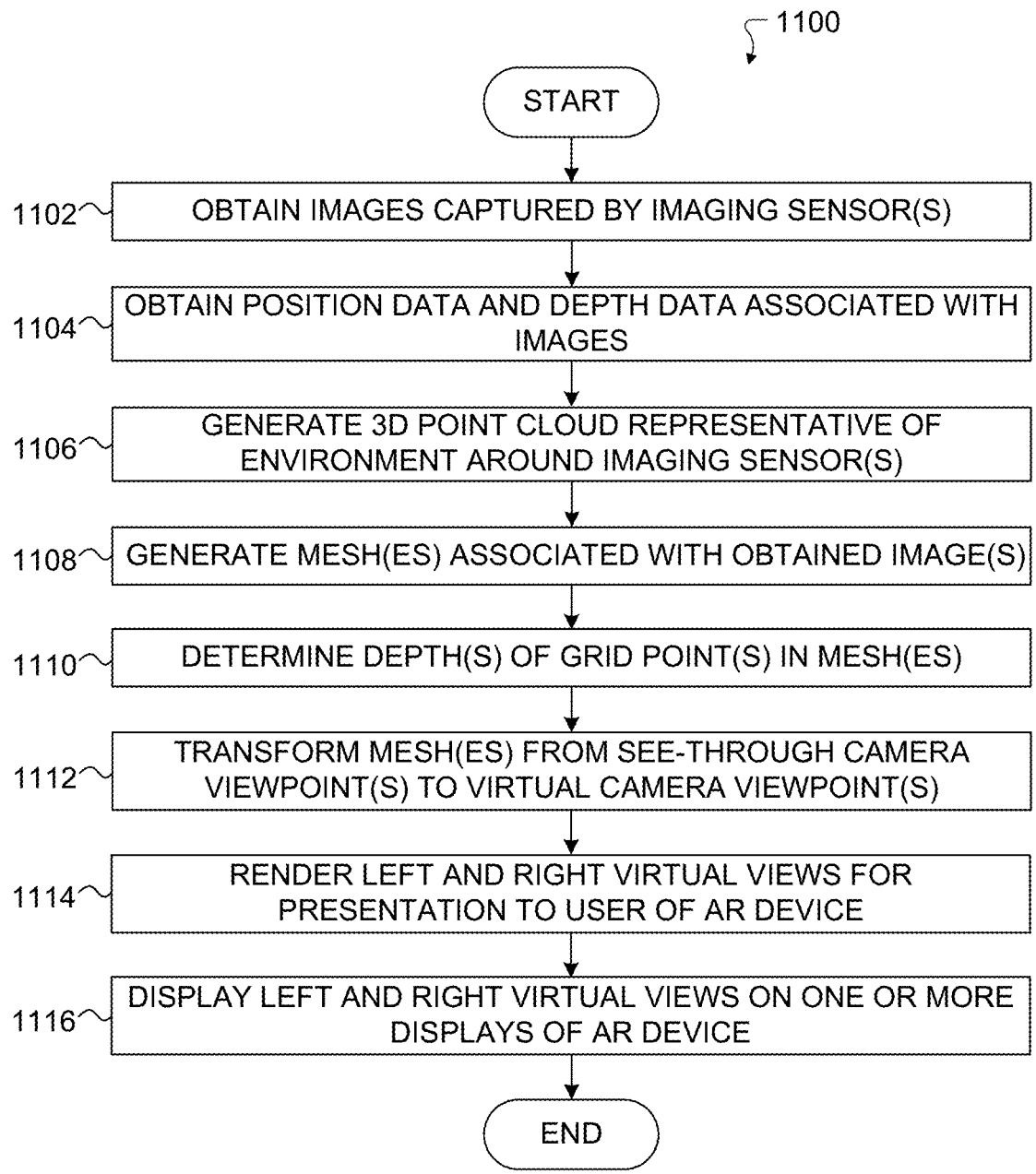
FIG. 11 illustrates an example method for mesh transformation with efficient depth reconstruction and filtering in a passthrough AR system in accordance with this disclosure.

FIG. 11 illustrates an example method 1100 for mesh transformation with efficient depth reconstruction and filtering in a passthrough AR system in accordance with this disclosure. For ease of explanation, the method 1100 is described as being performed by the electronic device 101 in the network configuration 100 of FIG. 1, where the electronic device 101 implements the architecture 300 of FIG. 3. However, the method 1100 may be performed using any other suitable device(s) and architecture(s) and in any other suitable system(s).

As shown in FIG. 11, images captured using one or more imaging sensors are obtained at step 1102. This may include, for example, the processor 120 of the electronic device 101 obtaining input images 302 that were captured using one or more see-through cameras 204, 204a-204b or other imaging sensor(s) 180 of the electronic device 101. Position data and depth data associated with the images are obtained at step 1104. This may include, for example, the processor 120 of the electronic device 101 obtaining position information 304 from an inertial measurement unit, accelerometer, gyroscope, or other positional sensors 180 of the electronic device 101. This may also include the processor 120 of the electronic device 101 obtaining depth information 306 from one or more depth sensors 180 of the electronic device 101.

A 3D point cloud representative of an environment around the imaging sensor(s) is generated at step 1106. This may include, for example, the processor 120 of the electronic device 101 processing the input images 302 and the positional information 304 in order to generate one or more poses 310 of the one or more see-through cameras 204, 204a-204b or other imaging sensor(s) 180 of the electronic device 101. This may also include the processor 120 of the electronic device 101 processing the input images 302 and the positional information 304 in order to generate 3D sparse points 312 as defined using the input images 302. This may further include the processor 120 of the electronic device 101 processing the poses 310 and the 3D sparse points 312 in order to generate a 3D point cloud representative of the environment around the one or more see-through cameras 204, 204a-204b or other imaging sensor(s) 180 of the electronic device 101.

One or more meshes for one or more of the input images are generated at step 1108. This may include, for example, the processor 120 of the electronic device 101 processing the input images 302 in order to identify one or more objects in the input images 302 and generating meshes 206 associated with the input images 302 or the objects in the input images 302. One or more depths of one or more grid points in at least one of the meshes are determined at step 1110. This may include, for example, the processor 120 of the electronic device 101 determining whether each grid point in each mesh 206 has a known or measured depth. This may also include the processor 120 of the electronic device 101 creating at least one depth filter and applying the at least one depth filter to a neighborhood of depth values around each grid point for which there is not a known or measured depth in each mesh 206 (and possibly even for those grid points for which there are known or measured depths in order to perform filtering, noise removal, verification, etc.).

Each of the one or more meshes is transformed from a viewpoint of a see-through camera to a viewpoint of a virtual rendering camera at step 1112. This may include, for example, the processor 120 of the electronic device 101 warping or otherwise transforming a mesh 206 into a corresponding transformed mesh 216 based on knowledge of the relationships between the see-through cameras 204, 204a-204b and the virtual rendering cameras 212 and knowledge of the depths in the scene. Left and right virtual views are rendered for presentation on an AR device at step 1114. This may include, for example, the processor 120 of the electronic device 101 constructing left and right virtual views that include digital content to be provided to a user. In some embodiments, this may include the processor 120 of the electronic device 101 using the one or more transformed meshes 216 to warp one or more input images 302 and to perform parallax correction and occlusion overlapping for digital content (like one or more virtual objects) being inserted into the input images 302. The left and right virtual views are displayed on the AR device at step 1116. This may include, for example, the processor 120 of the electronic device 101 initiating display of the left and right virtual views on the display panel(s) 208 of the electronic device 101.

Although FIG. 11 illustrates one example of a method 1100 for mesh transformation with efficient depth reconstruction and filtering in a passthrough AR system, various changes may be made to FIG. 11. For example, while shown as a series of steps, various steps in FIG. 11 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining images of an environment captured by imaging sensors associated with a passthrough augmented reality (AR) device, position data associated with the images, and depth data associated with the images;
generating a point cloud that is representative of the environment based on the images, the position data, and the depth data;
generating a mesh for a specified one of the images, the mesh comprising grid points at intersections of mesh lines;
determining one or more depths of one or more of the grid points of the mesh by applying a depth filter to the depth data of the specified image;
transforming the mesh from a viewpoint of a specified one of the imaging sensors that captured the specified image to a user viewpoint of the passthrough AR device based on the one or more depths of the one or more grid points; and
rendering a virtual view of the specified image for presentation by the passthrough AR device based on the transformed mesh.

2. The method of claim 1, wherein determining the one or more depths of the one or more grid points comprises determining the one or more depths of the one or more grid points based on at least one of: image feature information, depth feature information, object pose information, image intensity information, and spatial information.

3. The method of claim 1, wherein generating the point cloud comprises generating the point cloud based on (i) first depth data collected by one or more depth sensors associated with the passthrough AR device and (ii) second depth data determined by applying simultaneous localization and mapping (SLAM) to the specified image and the position data.

4. The method of claim 1, wherein determining the one or more depths of the one or more grid points comprises determining a depth of a specified one of the one or more grid points based on a weighted average of known depths associated with points within a threshold distance of the specified grid point in the point cloud.

5. The method of claim 4, wherein the weighted average is determined using weights that are based on at least one of: image feature information, depth feature information, object pose information, image intensity information, and spatial information.

6. The method of claim 1, wherein rendering the virtual view comprises:
determining a parallax of a virtual object and a position of the virtual object relative to one or more real objects in the specified image based on the transformed mesh; and
rendering the virtual view of the specified image to include the virtual object based on the determined parallax and the determined position.

7. The method of claim 1, further comprising:
generating different meshes for different ones of the images;
for each of the meshes, determining one or more depths of one or more grid points in the mesh and transforming the mesh based on the one or more depths; and
rendering different virtual views of the different ones of the images for presentation by the passthrough AR device based on different ones of the transformed meshes.

8. A passthrough augmented reality (AR) device comprising:
imaging sensors configured to capture images of an environment;
at least one processing device configured to:
obtain the images, position data associated with the images, and depth data associated with the images;
generate a point cloud that is representative of the environment based on the images, the position data, and the depth data;
generate a mesh for a specified one of the images, the mesh comprising grid points at intersections of mesh lines;
determine one or more depths of one or more of the grid points of the mesh by applying a depth filter to the depth data of the specified image;
transform the mesh from a viewpoint of a specified one of the imaging sensors that captured the specified image to a user viewpoint of the passthrough AR device based on the one or more depths of the one or more grid points; and
render a virtual view of the specified image based on the transformed mesh; and
at least one display configured to present the virtual view.

9. The passthrough AR device of claim 8, wherein the at least one processing device is configured to determine the one or more depths of the one or more grid points based on at least one of: image feature information, depth feature information, object pose information, image intensity information, and spatial information.

10. The passthrough AR device of claim 8, wherein the at least one processing device is configured to generate the point cloud based on (i) first depth data collected by one or more depth sensors associated with the passthrough AR device and (ii) second depth data determined by applying simultaneous localization and mapping (SLAM) to the specified image and the position data.

11. The passthrough AR device of claim 8, wherein the at least one processing device is configured to determine a depth of a specified one of the one or more grid points based on a weighted average of known depths associated with points within a threshold distance of the specified grid point in the point cloud.

12. The passthrough AR device of claim 11, wherein the at least one processing device is configured to determine the weighted average using weights that are based on at least one of: image feature information, depth feature information, object pose information, image intensity information, and spatial information.

13. The passthrough AR device of claim 8, wherein, to render the virtual view, the at least one processing device is configured to:
determine a parallax of a virtual object and a position of the virtual object relative to one or more real objects in the specified image based on the transformed mesh; and
render the virtual view of the specified image to include the virtual object based on the determined parallax and the determined position.

14. The passthrough AR device of claim 8, wherein the at least one processing device is configured to:
generate different meshes for different ones of the images;
for each of the meshes, determine one or more depths of one or more grid points in the mesh and transform the mesh based on the one or more depths; and
render different virtual views of the different ones of the images for presentation by the passthrough AR device based on different ones of the transformed meshes.

15. A non-transitory machine readable medium containing instructions that when executed cause at least one processor of a passthrough augmented reality (AR) device to:
- obtain images of an environment captured by imaging sensors associated with the passthrough AR device, position data associated with the images, and depth data associated with the images;
- generate a point cloud that is representative of the environment based on the images, the position data, and the depth data;
- generate a mesh for a specified one of the images, the mesh comprising grid points at intersections of mesh lines;
- determine one or more depths of one or more of the grid points of the mesh by applying a depth filter to the depth data of the specified image;
- transform the mesh from a viewpoint of a specified one of the imaging sensors that captured the specified image to a user viewpoint of the passthrough AR device based on the one or more depths of the one or more grid points; and
- render a virtual view of the specified image for presentation by the passthrough AR device based on the transformed mesh.

16. The non-transitory machine readable medium of claim 15, wherein the instructions that when executed cause the at least one processor to determine the one or more depths of the one or more grid points comprise:
- instructions that when executed cause the at least one processor to determine the one or more depths of the one or more grid points based on at least one of: image feature information, depth feature information, object pose information, image intensity information, and spatial information.

17. The non-transitory machine readable medium of claim 15, wherein the instructions that when executed cause the at least one processor to generate the point cloud comprise:
- instructions that when executed cause the at least one processor to generate the point cloud based on (i) first depth data collected by one or more depth sensors associated with the passthrough AR device and (ii) second depth data determined by applying simultaneous localization and mapping (SLAM) to the specified image and the position data.

18. The non-transitory machine readable medium of claim 15, wherein the instructions that when executed cause the at least one processor to determine the one or more depths of the one or more grid points comprise:
- instructions that when executed cause the at least one processor to determine a depth of a specified one of the one or more grid points based on a weighted average of known depths associated with points within a threshold distance of the specified grid point in the point cloud.

19. The non-transitory machine readable medium of claim 15, wherein the instructions that when executed cause the at least one processor to render the virtual view comprise:
- instructions that when executed cause the at least one processor to:
  - determine a parallax of a virtual object and a position of the virtual object relative to one or more real objects in the specified image based on the transformed mesh; and
  - render the virtual view of the specified image to include the virtual object based on the determined parallax and the determined position.

20. The non-transitory machine readable medium of claim 15, wherein the instructions when executed cause the at least one processor to:
- generate different meshes for different ones of the images;
- for each of the meshes, determine one or more depths of one or more grid points in the mesh and transform the mesh based on the one or more depths; and
- render different virtual views of the different ones of the images for presentation by the passthrough AR device based on different ones of the transformed meshes.

* * * * *